United States Patent
Humburg et al.

(10) Patent No.: US 9,267,407 B2
(45) Date of Patent: Feb. 23, 2016

(54) EXHAUST SYSTEM AIR FILTRATION HOUSING

(71) Applicant: South Dakota Board of Regents, Pierre, SD (US)

(72) Inventors: Daniel S. Humburg, Brookings, SD (US); Kevin J. Dalsted, Brookings, SD (US); ZhengRong Gu, Brookings, SD (US); Joseph P. Polin, Tyngsboro, MA (US)

(73) Assignee: South Dakota Board of Regents, Pierre, SD (US)

( * ) Notice: Subject to any disclaimer, the term of this patent is extended or adjusted under 35 U.S.C. 154(b) by 25 days.

(21) Appl. No.: 13/936,537

(22) Filed: Jul. 8, 2013

(65) Prior Publication Data
US 2014/0013730 A1   Jan. 16, 2014

Related U.S. Application Data

(60) Provisional application No. 61/670,277, filed on Jul. 11, 2012.

(51) Int. Cl.
| | |
|---|---|
| *F01N 1/00* | (2006.01) |
| *F01N 3/00* | (2006.01) |
| *F01N 13/10* | (2010.01) |
| *F02B 37/00* | (2006.01) |

(52) U.S. Cl.
CPC ........ *F01N 3/00* (2013.01); *F01N 13/10* (2013.01); *F02B 37/00* (2013.01); *Y02T 10/144* (2013.01)

(58) Field of Classification Search
CPC ............ F01N 3/00; F01N 13/10; F02B 37/00
See application file for complete search history.

(56) References Cited

U.S. PATENT DOCUMENTS

| | | | |
|---|---|---|---|
| 3,928,963 A * | 12/1975 | Devers et al. | 60/806 |
| 3,949,726 A * | 4/1976 | List | 123/198 E |
| 3,951,114 A * | 4/1976 | Fachbach et al. | 123/41.7 |
| 3,964,462 A * | 6/1976 | Thien et al. | 123/198 E |
| 4,071,009 A * | 1/1978 | Kraina | 123/198 E |
| 4,203,407 A * | 5/1980 | Fachbach et al. | 123/198 E |
| 4,443,236 A | 4/1984 | Peiler | |
| 4,459,944 A * | 7/1984 | Kirchweger et al. | 123/41.66 |
| 4,562,895 A * | 1/1986 | Kirchweger | 180/68.1 |
| 5,261,356 A * | 11/1993 | Takahashi et al. | 123/41.31 |
| 5,463,867 A * | 11/1995 | Ruetz | 60/602 |
| 5,474,498 A | 12/1995 | Rauckman | |
| 7,833,301 B2 | 11/2010 | Schindler et al. | |
| 7,878,171 B2 | 2/2011 | Vandike et al. | |
| 7,946,368 B2 | 5/2011 | Vandike et al. | |
| 8,756,911 B1* | 6/2014 | Liang | 60/269 |
| 2003/0115845 A1 | 6/2003 | Petersen, Jr. | |
| 2004/0083730 A1* | 5/2004 | Wizgall et al. | 60/614 |
| 2005/0205352 A1* | 9/2005 | Colin | 181/249 |

(Continued)

*Primary Examiner* — Jesse Bogue
(74) *Attorney, Agent, or Firm* — Bell & Manning, LLC

(57) ABSTRACT

An engine exhaust system attachment is provided that includes a housing a fan, a filter, and a conduit. The housing is configured to enclose an exhaust turbine, an exhaust manifold, and at least a portion of an exhaust pipe. The exhaust turbine, the exhaust manifold, and the exhaust pipe are connected to receive exhaust gas from an engine and are mounted to an engine frame of a device. The fan is configured for mounting to the device to move air. The filter is configured for mounting to the fan to receive the moved air and to provide filtered air. The conduit is configured for connecting the filter to the housing to provide the filtered air to the housing.

20 Claims, 4 Drawing Sheets

(56) References Cited

U.S. PATENT DOCUMENTS

| | | |
|---|---|---|
| 2006/0283157 A1 | 12/2006 | Keys, II et al. |
| 2007/0012000 A1 | 1/2007 | Maas et al. |
| 2007/0012495 A1 | 1/2007 | Shannon, Jr. et al. |
| 2008/0010959 A1 | 1/2008 | Gillingham et al. |
| 2008/0016833 A1 | 1/2008 | Sheidler et al. |
| 2008/0086989 A1 | 4/2008 | Sheidler |
| 2008/0257531 A1 | 10/2008 | D'hondt et al. |
| 2010/0025007 A1 | 2/2010 | Fell et al. |
| 2010/0211293 A1* | 8/2010 | Yamada et al. ............... 701/108 |

* cited by examiner

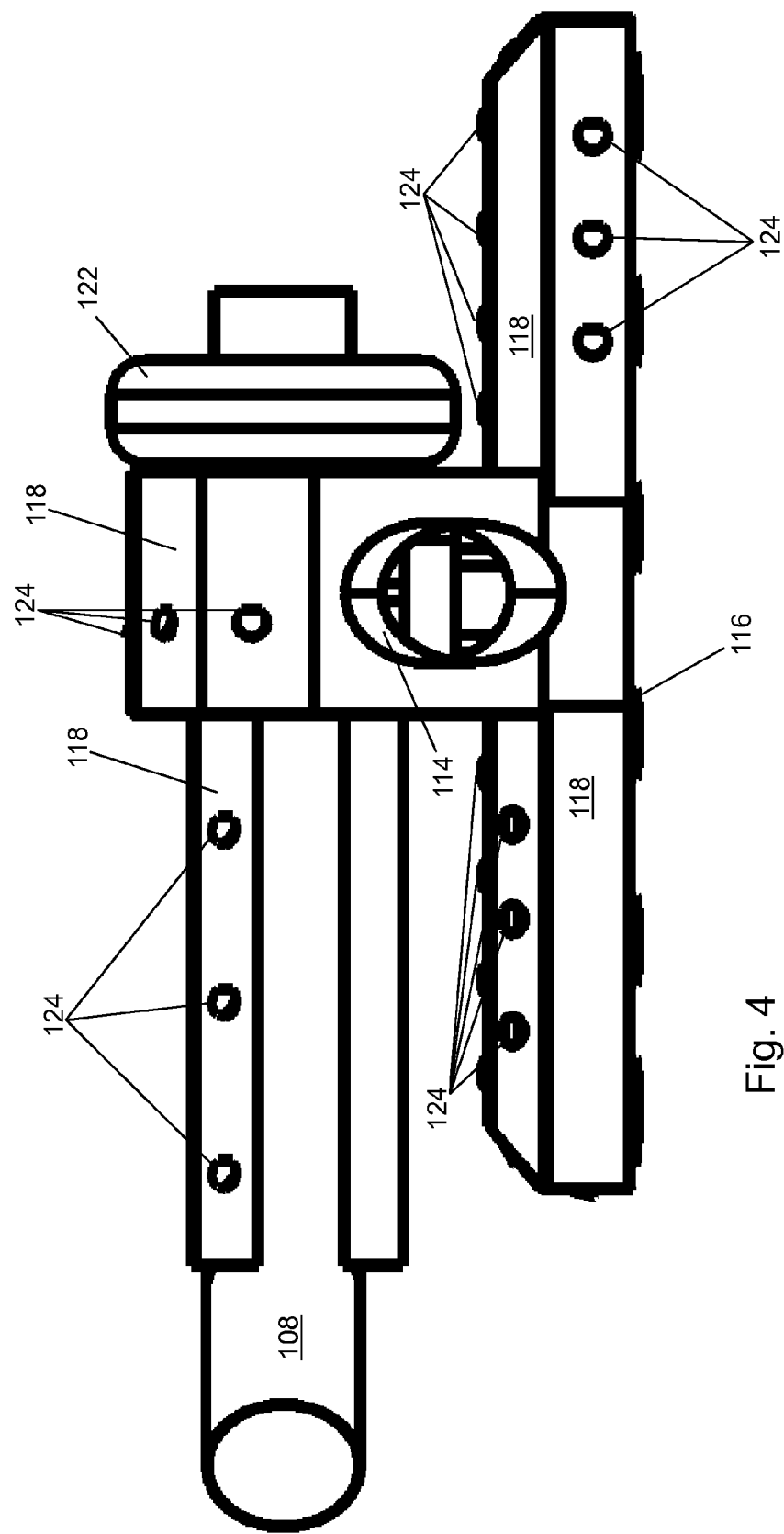

EXHAUST SYSTEM AIR FILTRATION HOUSING

CROSS-REFERENCE TO RELATED APPLICATIONS

The present application claims priority to U.S. Provisional Patent Application No. 61/670,277 that was filed Jul. 11, 2012, the entire contents of which are hereby incorporated by reference.

BACKGROUND

A fire problem exists in gasoline- and diesel-powered equipment operated in environments in which volumes of organic dusts become aerosolized. The sources of the particles are typically plant residues and there particle sizes are small enough to be suspended in the air. The particles can be deposited and build up on surfaces on the equipment. The equipment is generally equipped with some form of screen to prevent larger airborne residue from reaching the radiator system on the equipment. Small aerosol particles are not, however, trapped by this screen, and it is not practical to filter this volume of air to remove the fine dust. Airborne dust passing through the screen and radiators is then blown by the radiator fan across the surface of the engine. Airborne dust can also enter the engine compartment when winds cause crop dusts from the separator discharge to surround the machine and the dust is entrained.

Engines in agricultural and off-road equipment utilize turbochargers to allow higher power and fueling rates in a compact engine. Trends towards higher specific power levels in engines means high levels of exhaust energy and high temperatures in the components of the exhaust system. Specifically, the exhaust manifold and exhaust turbine reach the highest sustained temperatures external to the engine. Organic dust in the air stream is drawn through the radiators or is entrained into this airstream from dust surrounding the machine and is blown across the exhaust system components including the exhaust manifold and the exhaust turbine. When the engine is heavily loaded and the dust particles are very dry, it is possible for dust deposits on hot surfaces to smolder and/or for some portion of the airborne dust particles passing close to the hottest components to reach auto ignition temperature. These burning particles can be aerosolized or, in the case of airborne particles, remain aerosolized. Subsequently, these particles may be deposited on equipment surfaces that are already coated with combustible residues. Burning particles or embers can then cause smoldering fires to start in a variety of locations on the equipment. When a smoldering residue fire reaches fuel, oil, or synthetic materials, it can spread catastrophically to consume the equipment.

SUMMARY

In an example embodiment, an engine exhaust system attachment is provided that includes, but is not limited to, a housing, a fan, a filter, and a conduit. The housing is configured to enclose an exhaust turbine, an exhaust manifold, and at least a portion of an exhaust pipe. The exhaust turbine, the exhaust manifold, and the exhaust pipe are connected to receive exhaust gas from an engine and are mounted to an engine frame of a device. The fan is configured for mounting to the device to move air. The filter is configured for mounting to the fan to receive the moved air and to provide filtered air. The conduit is configured for connecting the filter to the housing to provide the filtered air to the housing.

In another example embodiment, an engine is provided that, but is not limited to, a combustion chamber, an exhaust turbine, an exhaust manifold, an exhaust pipe, a housing, a fan, a filter, and a conduit. The exhaust turbine is mounted to receive exhaust gas from the combustion chamber. The exhaust manifold and the exhaust pipe are mounted to the exhaust turbine. The housing is configured to enclose the exhaust turbine, the exhaust manifold, and at least a portion of the exhaust pipe. The exhaust turbine, the exhaust manifold, and the exhaust pipe are mounted to an engine frame of a device. The fan is configured for mounting to the device to move air. The filter is configured for mounting to the fan to receive the moved air and to provide filtered air. The conduit is configured for connecting the filter to the housing to provide the filtered air to the housing.

In yet another example embodiment, a device is provided that, but is not limited to, a frame, an engine frame mounted to the frame, a combustion chamber, an exhaust turbine mounted to receive exhaust gas from the combustion chamber, an exhaust manifold and an exhaust pipe mounted to the exhaust turbine, a housing, a fan, a filter, and a conduit. The housing is mounted to the frame and configured to enclose the exhaust turbine, the exhaust manifold, and at least a portion of the exhaust pipe. The fan is mounted to the frame to move air. The filter is configured for mounting to the fan to receive the air moved by the fan and to provide filtered air. The conduit is configured for connecting the filter to the housing to provide the filtered air to the housing.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4 depicts an exhaust system arrangement mounting of the device drive system of FIG. 1 in accordance with an illustrative embodiment.

DETAILED DESCRIPTION

Figure 1:
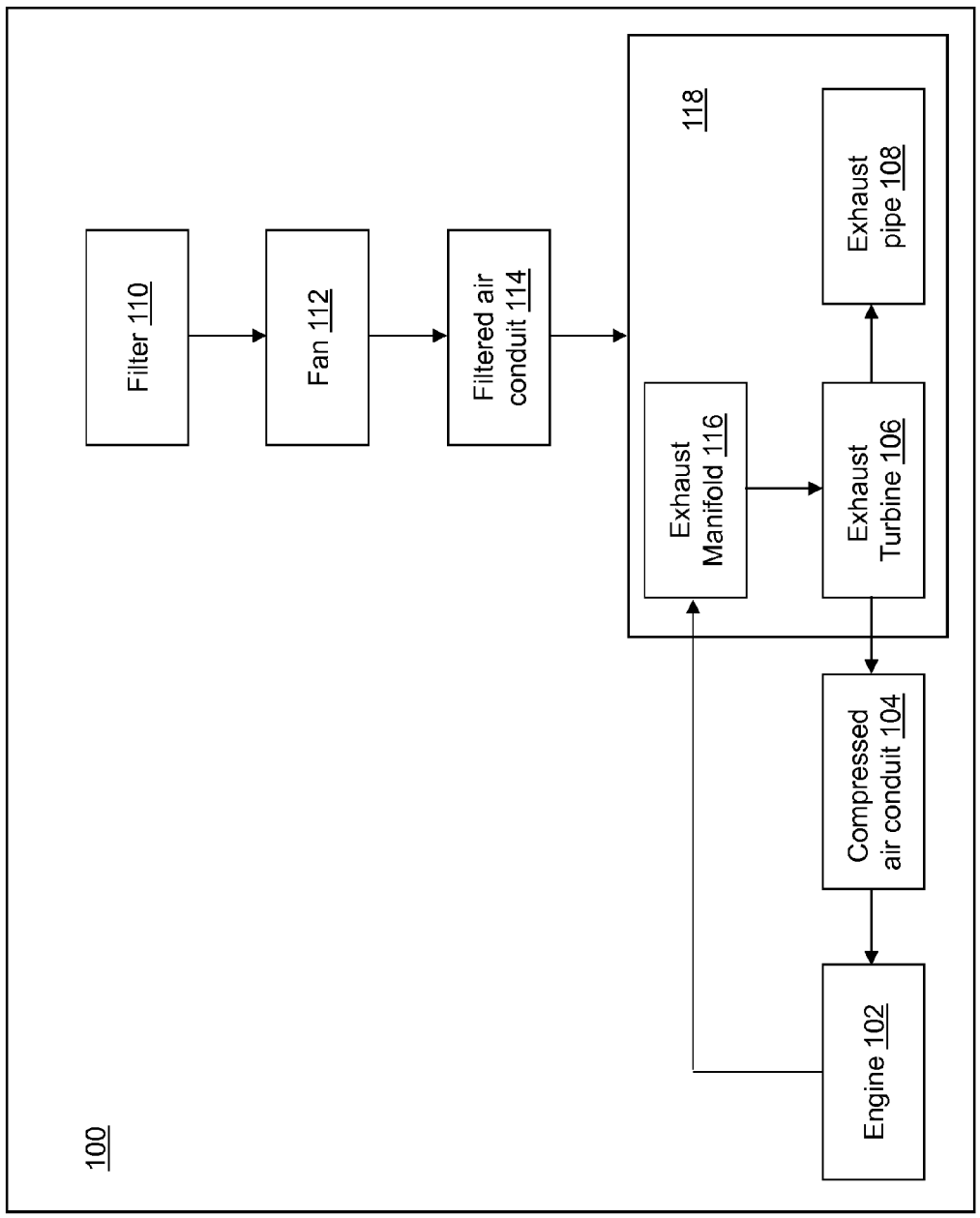
FIG. 1 depicts a block diagram of a device drive system in accordance with an illustrative embodiment.

With reference to FIG. 1, a block diagram of a device drive system 100 is shown in accordance with an illustrative embodiment. In an illustrative embodiment, device drive system 100 may include an engine 102, an air conduit 104, an exhaust turbine 106, an exhaust pipe 108, a filter 110, a fan 112, a filtered air conduit 114, and an exhaust manifold 116. A housing 118 surrounds exhaust turbine 106, at least a portion of exhaust pipe 108, and exhaust manifold 116. Device drive system 100 may be incorporated into various types of equipment including combine harvesters, a tractor, a cotton picker, a hay baler, off road vehicles, food processing machinery, etc. that operate in areas in which aerosol dust may contact exhaust system components leading to an increased potential for fires. Of course, the device in which device drive system 100 is incorporated may include additional components such as wheels, a drivetrain, a harvesting apparatus, operator controls, belts, etc.

During operation, engine 102 rotates and provides power to the device to provide, for example, propulsion, harvesting operations, belt operation, etc. As understood by a person of skill in the art, in general terms, engine 102 draws in air via an air filter for combustion of a fuel/air mixture in a combustion chamber (not shown) of engine 102.

Figure 2:
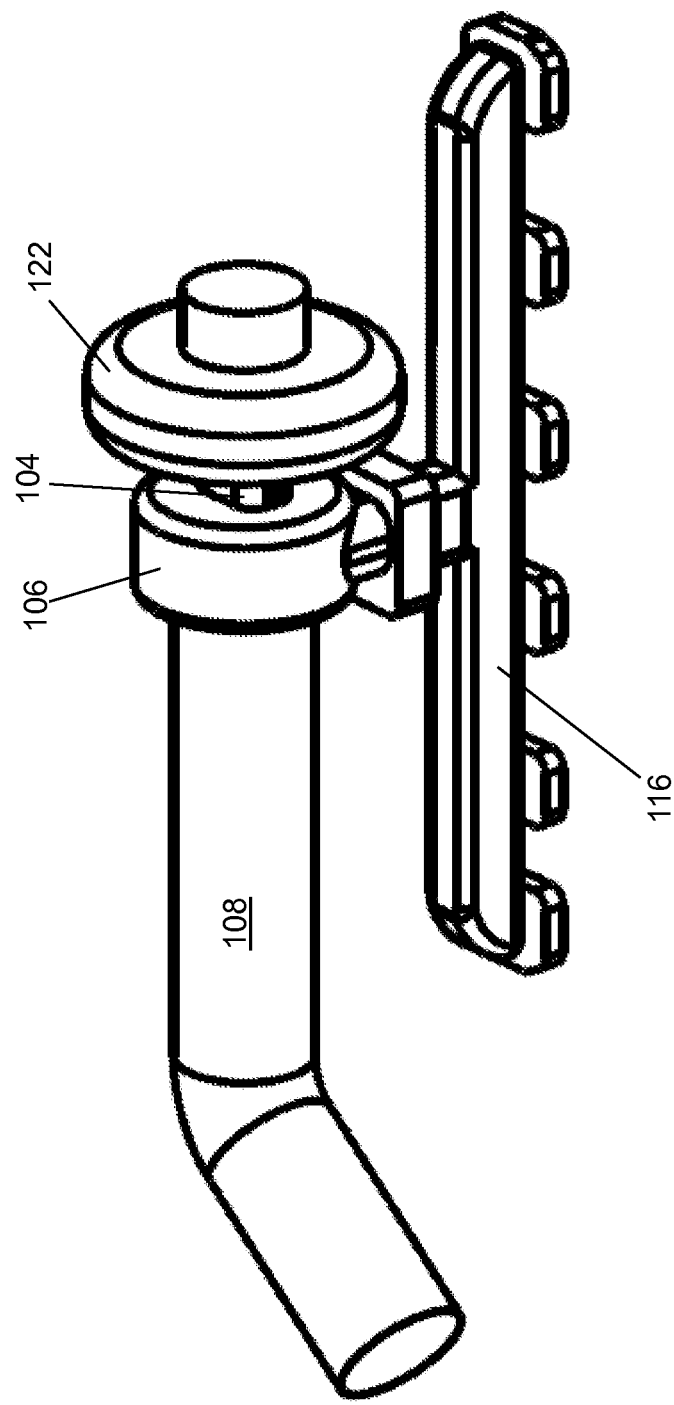
FIG. 2 depicts an exhaust system of the device drive system of FIG. 1 in accordance with an illustrative embodiment.
Figure 3:
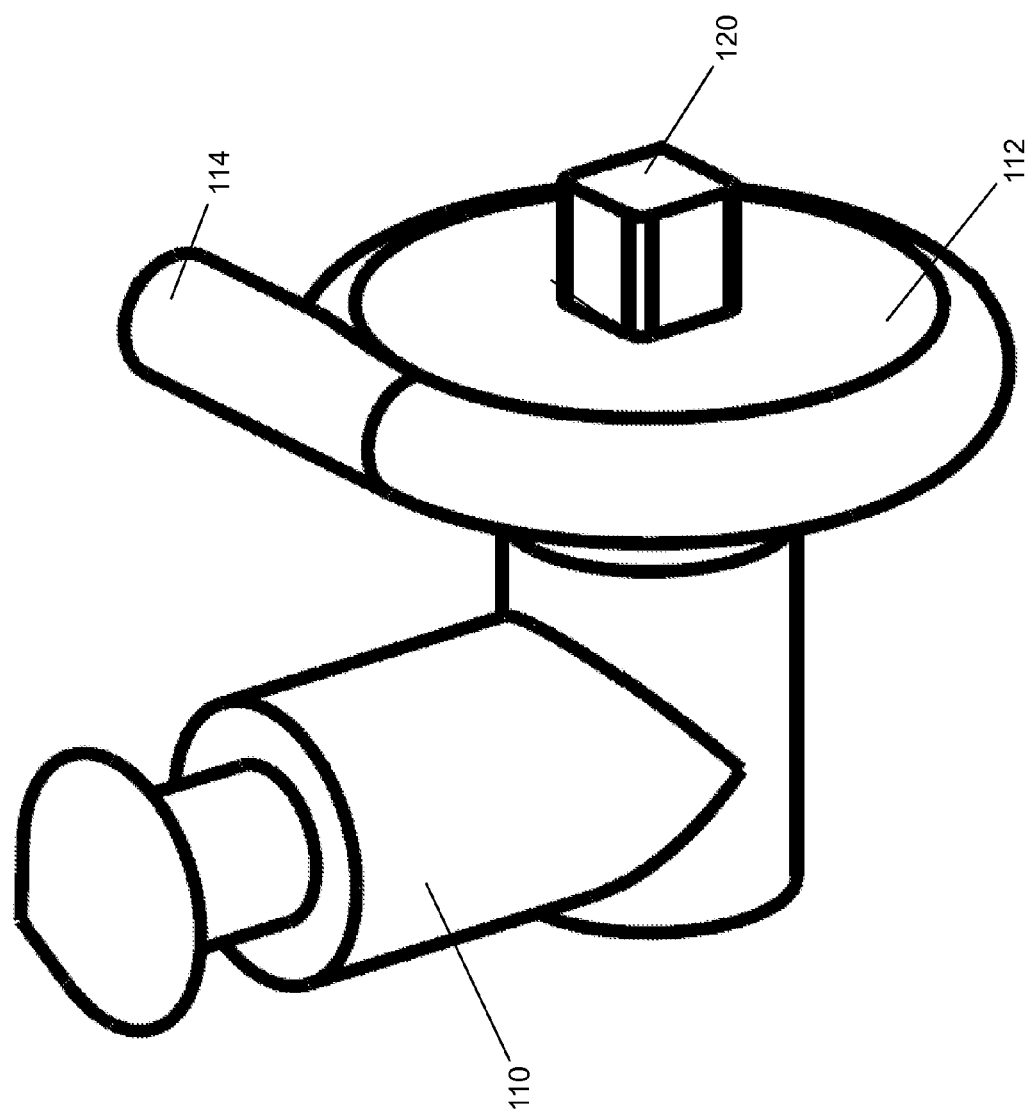
FIG. 3 depicts a filter and fan arrangement of the device drive system of FIG. 1 in accordance with an illustrative embodiment.

With reference to FIG. 2, an exhaust system of device drive system 100 is shown in accordance with an illustrative embodiment. The air is compressed with the aid of a turbocharger (not shown) which receives exhaust from exhaust turbine 106. For this purpose, the turbocharger is driven in a known manner, by way of exhaust turbine 106 connected to a compressor 122 by air conduit 104, which may receive all or a portion of the exhaust gas stream leaving engine 102 through exhaust manifold 116 after combustion. Some of the exhaust gas stream leaving exhaust manifold 116 may be routed by exhaust turbine 106 to flow through exhaust pipe 108, for example, when a set intake pressure is achieved. A muffler may be attached to exhaust pipe 108 at an end opposite exhaust turbine 106. Though not shown, in an illustrative embodiment, the muffler or other type of exhaust after treatment system also may be enclosed within housing 118. Exhaust after treatment systems may include diesel oxidation catalysts, diesel particulate filters, selective catalytic reduction systems, combinations of one or more of these, etc.

Filter 110, fan 112, filtered air conduit 114, and housing 118 form an engine exhaust system attachment configured to prevent aerosol dusts from reaching the zone around the hottest exhaust system components, which may include exhaust turbine 106, exhaust pipe 108, and exhaust manifold 116. For example, with reference to FIG. 3, fan 112 is mounted to a hydraulic motor 120 of engine 102. In the illustrative embodiment, hydraulic motor 120 provides power to operate fan 112.

With reference to FIG. 4, housing 118 is fitted to enclose exhaust turbine 106, a portion of exhaust pipe 108, and exhaust manifold 116 in accordance with an illustrative embodiment. A flow of dust-free air is introduced by fan 112 (not shown) and filter 110 (not shown) into housing 118 through filtered air conduit 114. Filtered air conduit 114 mounts to a portion of housing 118 that surrounds exhaust turbine 106.

Filter 110 is mounted to fan 112 to receive air drawn by fan 112 and to provide filtered air into filtered air conduit 114. Filter 110 may be a variety of filters configured to filter aerosol dust from air drawn by fan 112 as understood by a person of skill in the art. For illustration, dust may be defined as being less than approximately 200 microns in diameter. Thus, typically, dust used to evaluate engine combustion air filters is less than 0.0079 inch diameter.

The ISO 5011 test is used to evaluate an air filter, typically for consumption of air by an engine. Measures of performance include efficiency, holding capacity, and restriction. Filter efficiency is a measure of the filters overall ability to capture contaminants such as dust. In an illustrative embodiment, filter 110 may be designed to remove greater than approximately 97% of the dust. Illustrative filters include those manufactured by Baldwin Filters, Inc., WIX Filters, Purolator Filters LLC, General Motors under brand name AC Delco, etc. Filter 110 further may be designed to remove greater than approximately 99% of the dust. Filter 110 may be sized to allow a sufficient quantity of air to pass through based on the volume of housing 118, the estimated heat generated by exhaust turbine 106, exhaust pipe 108, and exhaust manifold 116, etc.

Fan 112 may be a variety of fans as understood by a person of skill in the art including a centrifugal fan or a squirrel cage fan. Fan 112 may be sized to propel a sufficient quantity of air based on the volume of housing 118, the estimated heat generated by exhaust turbine 106, exhaust pipe 108, and exhaust manifold 116, etc. Fan 112 may be mounted at various locations interior or exterior of device drive system 100. Fan 112 may be driven hydraulically, mechanically, or electrically from engine 102 as needed to obtain power to operate fan 112.

Filtered air conduit 114 connects filter 110 to housing 118 to provide the filtered air to housing 118. Filtered air conduit 114 may be sized and shaped to allow a sufficient quantity of air to pass through based on the volume of housing 118, the estimated heat generated by exhaust turbine 106, exhaust pipe 108, and exhaust manifold 116, etc. A length of filtered air conduit 114 may vary depending on the arrangement of device drive system 100 and filter 110 and fan 112.

Housing 118 may be fabricated from a heat resistant porous media, screen, mesh, or fabric. For example, a stainless steel mesh fabric, a ceramic fiber, or galvanized steel sheet metal material may be used. Additionally, a combination of materials may be used. For example, a galvanized steel enclosure with openings 124 fabricated with a stainless mesh across the openings could be used. Alternatively, housing 118 may be fabricated from a nonporous material provided with openings or vents to control the flow of air leaving housing 118. The porosity or openings in the material are sized to allow air flow, while providing some resistance to air flow. The pressure developed by airflow through the media keeps a positive pressure differential across all parts of housing 118. Filtered air flows across the inner surface of housing 118 and out through pores or openings 124 in housing 118, keeping the housing surface temperature below the dust ignition temperature. The airflow through the material may also serve to keep the surface of housing 118 free of accumulated dust. The use of filtered air around exhaust manifold 116 prevents a high proportion of the flammable dust from reaching the zone where ignition of the dusts could occur. Air flow rates are adjusted to maintain the enclosure surface at a temperature that does not provide an ignition source for aerosol or accumulated organic dusts, or crop residues that may reach exhaust turbine 106, exhaust pipe 108, and exhaust manifold 116.

Air conduit 104, exhaust turbine 106, exhaust pipe 108, and exhaust manifold 116 may be mounted to an engine block (not shown) as understood by a person of skill in the art. Filtered air conduit 114 mounts to a portion of housing 118 that surrounds exhaust manifold 116. Filtered air from fan 112 and filter 110 blows through filtered air conduit 114 and into housing 118.

In the illustrative embodiment, fan 112 creates a vacuum to draw air through filter 110 and into fan 112 where the air is propelled into housing 118. In another illustrative embodiment, fan 112 may be positioned to draw in unfiltered air that is pushed through filter 110 and into housing 118. In another illustrative embodiment, fan 112 may be positioned at an outlet of housing 118 to draw air through filter 110 and housing 118 with negative pressure and discharge the air from fan 112 to the atmosphere.

As used in this disclosure, the term “mount” includes join, unite, connect, associate, insert, hang, hold, affix, attach, fasten, bind, paste, secure, bolt, screw, rivet, solder, weld, glue, form over, layer, etch, and other like terms. The phrases “mounted on” and “mounted to” include any interior or exterior portion of the element referenced. As used herein, the mounting may be a direct mounting between the referenced components or an indirect mounting through intermediate components between the referenced components.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An engine exhaust system attachment comprising: a housing configured to enclose an exhaust turbine, an exhaust manifold, and at least a portion of an exhaust pipe, wherein the exhaust turbine, the exhaust manifold, and the exhaust pipe are configured for connection to receive exhaust gas from an engine and for mounting to an engine frame of a device, wherein the engine is not included in the housing; a fan configured for mounting to the device to move air; a filter configured for mounting to the fan to receive the air moved by the fan and to provide filtered air through the housing and through multiple openings located in the housing along the exhaust turbine, the exhaust manifold, and the portion of the exhaust pipe; and a conduit configured for connecting the filter directly to the housing to provide the filtered air to the housing.

2. The engine exhaust system attachment of claim 1, wherein the housing is further configured to enclose an exhaust after treatment system.

3. The engine exhaust system attachment of claim 2, wherein the exhaust after treatment system is mounted to the exhaust pipe.

4. The engine exhaust system attachment of claim 1, wherein the exhaust pipe is mounted to the exhaust turbine.

5. The engine exhaust system attachment of claim 4, wherein the exhaust manifold is mounted to the exhaust turbine.

6. The engine exhaust system attachment of claim 5, wherein the exhaust turbine is configured to route a portion of the received exhaust gas to the exhaust pipe when a set intake pressure is achieved.

7. The engine exhaust system attachment of claim 5, wherein an air conduit mounted to a compressor is configured to receive a portion of the received exhaust gas from the exhaust turbine, wherein the exhaust manifold receives the exhaust gas from the engine after combustion of the exhaust gas, and the exhaust manifold provides the received exhaust gas to the exhaust turbine.

8. The engine exhaust system attachment of claim 1, wherein the fan is mounted on an outlet side of the housing and configured to draw air through the filter.

9. The engine exhaust system attachment of claim 1, wherein the fan is mounted on an inlet side of the housing and configured to draw air through the filter.

10. The engine exhaust system attachment of claim 1, wherein the fan is mounted on an inlet side of the housing and configured to push air through the filter.

11. The engine exhaust system attachment of claim 1, wherein the filter is configured to remove greater than 97% of dust from the air received by the filter.

12. The engine exhaust system attachment of claim 1, wherein the filter is configured to remove greater than 99% of dust from the air received by the filter.

13. The engine exhaust system attachment of claim 1, wherein the housing is fabricated from a heat resistant porous material.

14. The engine exhaust system attachment of claim 13, wherein the heat resistant porous material is selected from the group consisting of a stainless steel mesh fabric, a ceramic fiber, and a galvanized steel sheet metal material.

15. The engine exhaust system attachment of claim 1, wherein the housing comprises an enclosure formed of a non-porous material, wherein the openings are formed through the non-porous material, wherein the openings in the non-porous material are covered by a heat resistant porous material.

16. The engine exhaust system attachment of claim 15, wherein the non-porous material is galvanized steel and the heat resistant porous material is a stainless steel mesh.

17. The engine exhaust system attachment of claim 15, wherein a porosity of the openings in the non-porous material is selected to provide a positive pressure differential across the housing.

18. The engine exhaust system attachment of claim 15, wherein the filtered air flows across an inner surface of the housing when the device is used and out through the openings in the non-porous material.

19. An engine comprising: a combustion chamber; an exhaust turbine mounted to receive exhaust gas from the combustion chamber; an exhaust manifold mounted to the exhaust turbine; an exhaust pipe mounted to the exhaust turbine; a housing configured to enclose the exhaust turbine, the exhaust manifold, and at least a portion of the exhaust pipe, wherein the exhaust turbine, the exhaust manifold, and the exhaust pipe are configured for mounting to an engine frame of a device, wherein the combustion chamber is not included in the housing; a fan configured for mounting to the device to move air; a filter configured for mounting to the fan to receive the air moved by the fan and to provide filtered air through the housing and through multiple openings located in exhaust pipe; and a conduit configured for connecting the filter directly to the housing to provide the filtered air to the housing.

20. A device comprising: a frame; an engine frame mounted to the frame; a combustion chamber; an exhaust turbine mounted to receive exhaust gas from the combustion chamber; an exhaust manifold mounted to the exhaust turbine; an exhaust pipe mounted to the exhaust turbine; a housing mounted to the frame and configured to enclose the exhaust turbine, the exhaust manifold, and at least a portion of the exhaust pipe, wherein the combustion chamber is not included in the housing; a fan mounted to the frame to move air; a filter configured for mounting to the fan to receive the air moved by the fan and to provide filtered air through the housing and through multiple openings located in the housing along the exhaust turbine, the exhaust manifold, and the portion of the exhaust pipe; and a conduit configured for connecting the filter directly to the housing to provide the filtered air to the housing.

* * * * *